(12) United States Patent
Urbanski et al.

(10) Patent No.: US 9,295,274 B1
(45) Date of Patent: Mar. 29, 2016

(54) ENZYMATIC HYDROLYSATES OF OKARA

(75) Inventors: Gregory E. Urbanski, Sahuarita, AZ (US); Kevin W. Lang, Lloyd Neck, NY (US)

(73) Assignee: Delavau L.L.C., Philadephia, PA (US)

( * ) Notice: Subject to any disclaimer, the term of this patent is extended or adjusted under 35 U.S.C. 154(b) by 1413 days.

(21) Appl. No.: 12/102,644

(22) Filed: Apr. 14, 2008

Related U.S. Application Data

(60) Provisional application No. 60/913,741, filed on Apr. 24, 2007.

(51) Int. Cl.
| | |
|---|---|
| *A23L 1/20* | (2006.01) |
| *A23J 1/14* | (2006.01) |
| *A23J 3/16* | (2006.01) |
| *A23J 3/34* | (2006.01) |

(52) U.S. Cl.
CPC .. *A23L 1/20* (2013.01); *A23J 1/148* (2013.01); *A23J 3/16* (2013.01); *A23J 3/346* (2013.01); *A23L 1/2006* (2013.01)

(58) Field of Classification Search
USPC .............................................. 426/44, 46, 634
See application file for complete search history.

(56) References Cited

U.S. PATENT DOCUMENTS

| | | | | |
|---|---|---|---|---|
| 5,723,328 | A * | 3/1998 | Dalboege et al. | 435/209 |
| 5,997,913 | A * | 12/1999 | Fowler et al. | 426/15 |
| 6,190,709 | B1 * | 2/2001 | Schoenmaker et al. | 426/46 |
| 6,537,597 | B1 * | 3/2003 | Nakamori et al. | 426/46 |
| 6,582,739 | B1 * | 6/2003 | Sawano et al. | 426/46 |
| 7,005,128 | B1 * | 2/2006 | Bedford et al. | 424/94.61 |
| 2005/0053705 | A1 * | 3/2005 | Gao et al. | 426/422 |

FOREIGN PATENT DOCUMENTS

| | | | | |
|---|---|---|---|---|
| WO | WO 9632852 | A1 * | 10/1996 | A23L 1/308 |

OTHER PUBLICATIONS

O'Toole, Desmond. "Characteristics and Use of Okara, the Soybean Residue from Soy Milk Production—A Review". J. Agric. Food Chem, 1999, 47, 363-371. Published by the American Chemical Society.*

Boekel. "Formation of flavor compounds in the Maillard Reaction". Biotechnology Advances 24 (2006) 230-233. Available online as of Jan. 4, 2006.*

Decision on Appeal mailed Oct. 9, 2014 in U.S. Appl. No. 11/170,614.

* cited by examiner

*Primary Examiner* — Jenna A Watts
(74) *Attorney, Agent, or Firm* — Lewis Rice LLC

(57) ABSTRACT

Methods for hydrolyzing okara using endopeptidase and/or endoglucanase enzymes are disclosed. The hydrolyzed okara has a diminished water-holding capacity and is useful for supplementing the protein and fiber content of food products.

22 Claims, No Drawings

ENZYMATIC HYDROLYSATES OF OKARA

This application claims priority to provisional application Ser. No. 60/913,741, filed Apr. 24, 2007, the contents of which are hereby incorporated by reference in their entirety.

FIELD OF INVENTION

The present invention relates generally to hydrolysates of okara and methods for preparing such hydrolysates using hydrolytic enzymes.

BACKGROUND OF THE INVENTION

Okara is the pulp byproduct of soy milk production. The production, proximate composition, and uses of okara has been reviewed by O'Toole in "Characteristics and Use of Okara, the Soybean Residue from Soy Milk Production—A Review," *J. Agric. Food Chem.* 1999, 47, 363-371, the disclosure of which is hereby incorporated by reference.

Briefly, in the traditional method of soy milk production, soy beans are allowed to swell by soaking in water. In the Japanese method, the hydrated beans are cooked and then ground to a colloidal paste, whereas in the Chinese method the hydrated beans are ground without cooking. In either case, the water soluble materials are extracted from the colloidal paste and used to make soy milk and tofu and the remaining insoluble material is filtered off. The insoluble residue is most commonly referred to as okara (Japanese), although it is also referred to as douzha (Chinese), bejee (Korean), tofukasu (Japanese), bean-curd refuse, or simply soy pulp.

It has been estimated that in Japan alone, nearly one million tons of okara are produced every year by the tofu industry. However, okara has found only limited use as a human food source due to its high water activity which facilitates rapid microbiological spoilage and renders it largely incompatible with most foods. Consequently, most okara is burned as waste, dumped in landfills, or used in animal feeds. This is unfortunate, not only due to the adverse environmental consequences, but because okara contains roughly 30% of the total solids, 20% of the protein, and 11% of the oil from the soy bean and thus represents a largely untapped source of nutrients, including soluble and insoluble fiber, protein, iron, calcium and other minerals, as well as beneficial isoflavones. In fact, the protein efficiency ratio of okara has been reported to be higher than that of other soy products, including soy milk.

Some attempts have been made to utilize okara as a direct food additive. For example, Waliszewski and co-workers investigated the effect of okara supplementation on the properties of corn tortilla by adding dried okara at levels of 5, 10, 15, 20, and 25% to nixtamalized corn flour. It was reported that enriched tortillas at levels higher than 10% of okara had unacceptable flavor. See Waliszewski, et al., *J. Food Sci.* 67 (8), 3194-3197 (2002).

The effect of dry okara on the specific loaf volume and hardness of bread made from wheat flour has also been investigated. See Rie Horiuchi, et. al, *J. Integr. Stud. Diet. Habis,* 16, 31 (2005). It was reported that the addition of 10% and 20% dry okara to wheat flour resulted in a decrease in loaf volume of 18.7% and 32.2%, respectively, and an increase in hardness from 0.24±0.04 Pa for the control (without okara) to 0.44±0.07 Pa and 0.9±0.05 Pa, respectively. Similarly, Bowles et al., "Physicochemical characterization of the soymilk by product—okara" *Ciênc. Tecnol. Aliment.*, vol. 26, no. 3, p. 652-659 (July/September 2006) investigated the addition of dried okara to French type bread at 0, 5, 10, and 15% and report that sensorial analysis using a preference test favored the breads having lower levels of okara over the bread containing 15% okara.

Because of the high water-holding capacity and the off-taste often associated with okara, various attempts have been made to convert okara into forms more suitable for human food products.

Throughout Southeast Asia, okara has been fermented with the fungus *Rhizopus oligosporus* to make okara tempe, often called tempe gembus (Indonesian), which is eaten alone or added to other foods. Okara tempe has been reported to overcome some of the disadvantages of okara and is considered to have certain benefits including reduction in caloric intake, lowering of serum cholesterol levels, and high antioxidant activity. However, it has been reported that, while okara tempe is a good source of dietary fiber, the protein efficiency ratio of okara tempe is reduced as compared to okara. Furthermore, the range of food applications to which okara tempe can be adapted is limited.

JP 09-285,251 discloses a process for coating okara with shortening and the use of the resulting ingredient as a wheat substitute for cakes.

U.S. Pat. No. 5,690,981 to Anjinomoto Co. discloses a method for finely pulverizing okara to provide dietary fibers of rod-like shape of not greater than 5 microns in length. It is stated that the dietary fibers have reduced water-holding capacity due to their small size and can be used to reduce the caloric content of foodstuffs.

Several patents to Fuji Oil Company, including U.S. Pat. No. 5,587,197, U.S. Pat. No. 6,280,526, and U.S. Pat. No. 6,569,473 disclose a process for degrading okara under acid hydrolysis conditions to provide a water-soluble hemicellulose for inclusions in low-calorie food products.

Despite these advances, there is a continuing need in the art for modified okara compositions, particularly those having diminished water-holding capacity, for use as ingredients in foodstuffs.

It is therefore an object of the invention to provide methods for converting okara into forms more suitable for inclusion in food products. In particular, it is an object of the invention to provide modified okara compositions having diminished water-holding capacity as compared to unmodified okara, but which possesses many, if not all, of the nutritive benefits of okara.

It is further an object of the invention to provide food additives derived from okara which are suitable to augment the protein and/or fiber content of a variety of food products and which do not impart objectionable tastes or textures to conventional food products.

SUMMARY OF THE INVENTION

In accordance with these and other objectives, the present invention provides enzymatic hydrolysates of okara which are useful as additives to food products and the like.

In one aspect of the invention, a method is provided for making an enzymatic hydrolysate of okara comprising contacting an aqueous dispersion of hydrated okara with one or more enzymes selected from the group consisting of endopeptidase enzymes, endoglucanase enzymes, and combinations thereof, preferably in the substantial absence of exopeptidase and/or exoglucanase enzymes, to provide an enzymatic hydrolysate of okara having a reduction in water-holding capacity (WHC) of about 5% to about 75% as compared to the WHC of the okara prior to enzymatic hydrolysis. In some variants according to this aspect of the invention, the reduction in WHC will be about 20% to about 60%, preferably about 35 to about 55%, as compared to the WHC of the okara prior to enzymatic hydrolysis.

In another aspect of the invention, a method is provided for making an enzymatic hydrolysate of okara comprising contacting an aqueous dispersion of hydrated okara with, in order, one or more endopeptidase enzymes and one or more endoglucanase enzymes, preferably in the substantial absence of exopeptidase and/or exoglucanase enzymes, to thereby provide an hydrolysate of okara having a synergistic reduction in water-holding capacity (WHC) as compared to the reduction in WHC obtainable with either the one or more endopeptidase enzymes or the one or more endoglucanase enzymes, alone, under identical conditions.

In a further aspect of the invention, a method is provided for making an enzymatic hydrolysate of okara comprising: (a) contacting an aqueous dispersion of hydrated okara with one or more endopeptidase enzymes and mixing therewith for about 30 to about 180 minutes at a temperature of about 100° F. to about 145° F. and a pH between about 5.5 to about 7; wherein the aqueous dispersion comprises a weight ratio of hydrated okara to water of about 3:1 to about 1:3, and the one or more endopeptidase enzymes are present, collectively, in an amount from about 0.1% to about 10% by weight based on the weight of protein in the hydrated okara; (b) contacting the aqueous dispersion with one or more endoglucanase enzymes at a pH between about 4 and about 6 and mixing therewith for about 45 to about 240 minutes at a temperature of about 100° F. to about 145° F.; wherein the one or more endoglucanase enzymes are present, collectively, in an amount from about 0.1% to about 10% by weight based on the weight of dietary fiber in the hydrated okara; (c) optionally, inactivating the enzymes; and (d) optionally, drying the aqueous dispersion to a moisture content of less than about 10% by weight, to provide an hydrolysate of okara comprising hydrolyzed protein and hydrolyzed fiber and having a water-holding capacity (WHC) which is reduced by about 5% to about 75% as compared to the WHC of the okara before enzymatic hydrolysis; wherein steps (a) and (b) are preferably performed in the substantial absence of exopeptidase and exoglucanase enzymes.

In a further aspect of the invention, enzymatic hydrolysate of okara, suitable for human consumption, are provided comprising hydrolyzed protein and/or hydrolyzed fiber and having a water-holding capacity (WHC) which is reduced by about 5 to about 75%, more typically by about 20% to about 60%, as compared to the WHC of unhydrolyzed okara. Food products, nutritional bars, and supplements comprising the enzymatic hydrolysates of okara are also provided.

These and other aspects of the invention may be more clearly understood by reference to the following detailed description of the invention and the appended claims.

DETAILED DESCRIPTION OF THE INVENTION

In the following description of the invention, it is to be understood that the terms used have their ordinary and accustomed meanings in the art, unless otherwise specified. All weights referred to herein are given in terms of "% by weight" of the total composition, unless otherwise indicated.

The definition of "okara," as used herein, is meant to broadly encompass any bean pulp comprising water insoluble dietary fiber and protein. It will be understood that the composition of okara will vary substantially depending on the method used to extract the water soluble components from the bean and may comprise more or less water soluble components depending on, for example, the number of water extractions to which it is subjected. Also, the proximate composition of okara can vary depending on bean cultivar, etc.

As used herein, the term "hydrated okara" refers to okara which has sorbed a substantial quantity of water. It is necessary that the okara be hydrated to facilitate the interaction of the hydrolytic enzymes with the fiber and/or protein constituents to ensure optimal hydrolysis. Freshly prepared okara is well hydrated and will typically have a moisture content between about 70% and 90%, more typically between about 75% to about 85%. Several okara samples studied by the present inventors comprised about 80% (±2%) by weight water. Dried okara can be hydrated by mixing with water. Thus, the aqueous dispersions of the present invention can suitably be prepared with dried okara which then becomes hydrated in situ prior to hydrolysis.

By "substantial absence" of exopeptidase and/or exoglucanase is meant that these hydrolytic enzymes will collectively comprise less than 1%, preferably, less than 0.5%, and more preferably less than 0.1% by weight based on the total weight of endopeptidase and/or endoglucanase enzymes added.

Water which is strongly associated with specific functional groups in protein or fiber ("bound water") is not removable by centrifugation. The amount of bound water remaining after centrifugation is expressed as the water-binding capacity ("WBC") of the protein or fiber. In contrast, the more loosely held water can be separated from protein or fiber substrate by centrifugation. The amount of such loosely held water is commonly expressed as the water-holding capacity ("WHC") of the protein or fiber. The improved performance of the okara hydrolysates of the invention is believed to arise due to reduction in the WHC of the protein or fiber as compared to the unhydrolyzed starting polymers present in okara. The WHC of the okara hydrolysates of the invention may be measured by the industry standard AACC ("American Association of Cereal Chemists") 56-11 or any similar centrifugation method. When conducting such tests, however, care must be taken to account for any amount of water-soluble material. WHC can also be measured by differential scanning calorimetry (DSC), nuclear magnetic resonance (NMR) measurement of freezable water, or any other technique known in the art. When measuring reduction in WHC, on a relative basis, the procedure described in Example 4 herein has proven especially useful.

A critical feature of the methods of the present invention is that the hydrolysates are prepared from okara through the action of so-called "endo" peptidases (proteases) and/or "endo" cellulases (glucanases). Thus, hydrolysis of the proteins and/or fibers occurs predominately at interior locations of the polymers rather than at chain ends, as would be the case if so-called "exo" hydrolytic enzymes were employed.

Enzymes cleaving the amide linkages in protein substrates are classified as peptidases or, synonymously, proteases or proteinases. Those peptidases having proteolytic activity specific to interior amide linkages in a protein are further categorized as endopeptidases. Endopeptidases are well known in the art and include, but are not limited to, glutamyl endopeptidase (SP 446) obtained from *Bacillus licheniformis* (Novo Nordisk) and disclosed in U.S. Pat. No. 5,523,237, Promod-TP (endopeptidase, Biocatalysts), the acylase enzyme Savinase (NOVO) which is a proteolytic enzyme prepared by submerged fermentation of an alkalophilic species of *Bacillus* and disclosed in U.S. Pat. No. 6,340,587 to Dawson et al., and those disclosed in U.S. Pat. No. 6,416,796 to Han et al., U.S. Pat. No. 5,691,162 to Shuster et al., U.S. Pat. No. 5,021,338 to Gianna et al., and U.S. Pat. No. 5,952,193 to Shimamura et al. Each of the foregoing patents is hereby incorporated by reference. Special mention may be made of the endopetidase Neutrase® (Novo Nordisk) which is a bacterial endopeptidase classified as a metallo protease (Zn), produced by a selected strain of *Bacillus amyloliquefaciens* and which contains only the neutral part of *B amyloliquefaciens* proteases. Many endopeptidases having activity specific to certain amino acid linkages are well known to the skilled artisan but are too numerous to reproduce herein. It is well within the skill in the art to identify suitable endopeptidases for use in the present invention. The present invention contemplates the use of any one endopeptidase, alone, or, alternatively, combinations of two or more endopeptidases may be employed.

Endoglucanases are a group of enzymes which catalyze "endo" (i.e., interior glycosidic bonds) hydrolysis of 1,4-β-D-glycosidic linkages in cellulose and cellulose derivatives, lichenin, β-1,4 bonds in mixed β-1,3 glucans such as cereal β-D-glucans or xyloglucans and other plant material containing cellulosic parts. See e.g. U.S. Pat. No. 6,214,598 to Dalboege et al., R. F. Gould, "Cellulases and their Application", Advances in Chemistry Series 55, American Chemical Society (1969), T. M. Wood, "Properties and Mode of Action of Cellulases", in Biotechnology and Bioengineering Symposium, no. 5, John Wiley, 111-137 (1975), Y.-H. Lee and L. T. Fan, "Properties and Mode of Action of Cellulase", Advances in Biochemical Engineering 17, 101-129 (1980), J. Goksyr and J. Eriksen, "Cellulases" in A. H. Rouse, Microbial Enzymes and Bioconversions, Academic Press, 283-330 (1980), T.-M. Enveri, "Microbial Cellulases" in W. M. Fogarty, Microbial Enzymes and Biotechnology, Applied Science Publishers, 183-224 (1983). Suitable endoglacanses include, without limitation, those described in U.S. Pat. No. 6,423,524 to Hagen et al., U.S. Pat. No. 6,214,598 to Dalboege et al., WO 89/00069, WO 93/20193, Ooi, T. et al., 1990, "Complete nucleotide sequence of a gene coding for *Aspergillus aculeatus* cellulase (FI-CMCase)", Nucleic Acids Research, Vol. 18, No. 19: 5884, Sharma, S. et al., 1991, "Physical characterization of isozymes of endo-β-1,4-glucanase and β-1,4-glucosidase from *Aspergillus* species", FEMS Microbiology Letters 79: 99-104, the disclosures of which are hereby incorporated by reference. Numerous endoglucanases are known to the skilled artisan and do not bear repeating herein. Currently preferred endoglucanses include Celluclast™ (Novo Nordisk) which is a liquid cellulase preparation produced by submerged fermentation of a selected strain of the fungus *Trichoderma reesei* and the commercial cellulase preparation Viscozyme L (Novo Nordisk) which is an endo-1,3(4) beta-glucanase with xylanase, hemicellulase and cellulase side activities, produced by submerged fermentation of the micro-organism *Aspergillus aculeatus*. It is contemplated that any one endoglucanse, alone, will be suitable for the practice of the invention, or, alternatively, a combination of more than one endoglucanse may be employed.

The invention embraces several related processes for hydrolyzing okara. The okara may be treated with one or more endopeptidases, alone, to hydrolyze only the protein components, or the okara may be treated with one or more endoglucanases, alone, to hydrolyze only the fiber components. Excellent results have also been obtained by using a combination of one or more endopeptidases and one or more endoglucanases. Typically, most endopeptidases have optimal activity at pH levels above the optimal pH for endoglucanase activity. Accordingly, okara is preferably separately contacted with endopeptidases and endoglucanases so that pH may be adjusted for optimal hydrolytic activity for both types of enzymes. Hydrolysis with one or more endopeptidases may be carried out before hydrolysis with the one or more endoglucanases, or conversely, hydrolysis with one or more endoglucanases may precede hydrolysis with the one or more endopeptidases. It is contemplated that in both cases, a synergistic reduction in water-holding capacity will be obtained as compared to the use of either endopeptidases or endoglucanases, alone.

The enzymatic hydrolysates of the invention typically will have a WHC which is reduced by at least about 5%, and typically between about 5% to about 75% as compared to the WHC of the unhydrolyzed okara. It has been found that the WHC of the hydrolysate will depend in part on which enzymes are employed. For example, if only endopeptidases are employed, the WHC may be reduced to a lesser degree than the case where only endoglucanases are used.

In one embodiment, a method for making an enzymatic hydrolysate of okara will comprising contacting an aqueous dispersion of hydrated okara with one or more endopeptidase enzymes, preferably in the substantial absence of exopeptidase enzymes, and mixing therewith, at high speed, under conditions sufficient to reduce the WHC of okara by about 5% to about 75%. The aqueous dispersion will comprises a weight ratio of hydrated okara to water of about 3:1 to about 1:3, more typically about 2:1 to about 1:2, preferably about 1:1 to about 1:1.5, and more preferably about 1:1.25. The conditions sufficient to reduce the WHC by about 5% to about 75% will depends on several factors including the length of hydrolysis, temperature, pH, and concentration of reactants. The pH is preferably selected to correspond to the pH at which the enzyme possesses optimal activity. For most endopeptidases this will be in the pH range of about 5.5 and about 7, more typically between about 6 and about 6.9. The endopetidase enzymes are expected to have substantial activity within the temperature range of about 100° F. to about 145° F. Below 100° F. the kinetics of the hydrolysis reaction are expected to be inconveniently slow and above 145° F., the endopeptidase will begin to loose activity. The temperature will preferably be between about 115° F. and 140° F., more preferably between about 120° F. and 130° F., including an exemplary embodiment at 125° F. The one or more endopeptidase enzymes will usually be present, collectively, in an amount from about 0.01% to about 10% by weight, more typically from about 0.1% to about 5% by weight, and preferably from about 0.1% to about 2% by weight, based on the weight of protein in the hydrated okara. Under the foregoing conditions, the time required to achieve a degree of hydrolysis sufficient to reduce the WHC by about 5% to about 75% will typically range from about 30 to about 180 minutes, more typically from about 30 to about 120 minutes, and preferably from about 30 to about 60 minutes.

In another embodiment, a method for making an enzymatic hydrolysate of okara will comprising contacting an aqueous dispersion of hydrated okara with one or more endoglucanase enzymes, preferably in the substantial absence of exoglucanase enzymes, and mixing therewith, at high speed, under conditions sufficient to reduce the WHC of okara by about 5% to about 75%. The aqueous dispersion will comprises a weight ratio of hydrated okara to water of about 3:1 to about 1:3, more typically about 2:1 to about 1:2, preferably about 1:1 to about 1:1.5, and preferably about 1:1.25. As with the hydrolysis of protein, the conditions sufficient to reduce the WHC by about 5% to about 75% under the endoglucanase hydrolysis of fiber will depends on the length of hydrolysis, temperature, pH, concentration of reactants, and the like. The endoglucanase enzymes will typically have highest activity at a pH between about 4 and about 6, more typically between about 4.5 and about 5.5, and preferably about 5. As with the endopeptidases, the endoglucanase enzymes are expected to have substantial activity within the temperature range of about 100° F. to about 145° F. The temperature will typically be between about 115° F. and 140° F., preferably between about 120° F. and 130° F., and more preferably about 125° F. The one or more endoglucanase enzymes will typically be present, collectively, in an amount from about 0.1% to about 10% by weight, more typically from about 0.1% to about 5% by weight, and preferably from about 0.1% to about 2% by weight, based on the weight of dietary fiber in the hydrated okara. Under these conditions, the reaction time sufficient to reduce the water-holding capacity of the okara will typically be about 45 to about 240 minutes, more typically about 60 minutes to about 180 minutes. Within the preferred paramaters of pH, temperature, and concentrations listed above, an hydrolysis time with endoglucanases of about 60 minutes to about 120 minutes has been found to be particularly useful.

In both the protein and fiber hydrolysis processes described above, it is desirable, though not strictly necessary, to inactivate the enzymes after the reaction has proceeded for the desired time. The enzymes can be deactivated by any method, included chemical deactivation or heat treatment. The preferred method is heat treatment which will typically involve heating the dispersion to above about 165° F. for at least about one minute or more, or heating above about 195° F. for 30 seconds or more.

Where it is desired to hydrolyze both protein and fiber, the above processes may be performed sequentially without the need for an intervening isolation of the first hydolysate. Preferably, the protein hydrolysis step is performed first, as described above. After the desired degree of protein hydrolysis is reached, the fiber hydrolysis step is performed, also as described above. If necessary, the pH may lowered by the addition of phosphoric acid or the like before carrying out the fiber hydrolysis to ensure optimal activity of the endoglucanses. It is not necessary to inactivate the endopeptidases by heat treatment before addition of the endoglucanases, provided that the endopeptidases do not have substantial activity at the pH required for endoglucanse activity, or provided that additional hydrolysis of protein is not deleterious to the product. Of course, it is within the scope of the invention to deactivate the endopeptidases by heat treatment prior to performing the fiber hydrolysis.

It is also contemplated that the fiber hydrolysis may be performed before the protein hydrolysis. In that case, it may be necessary to raise the pH of the aqueous dispersion by adding base (e.g., sodium hydroxide) after the fiber hydrolysis to ensure optimal pH for endopeptidase activity. Further, it may be desirable to deactivate the endoglucanse enzymes prior to the protein hydrolysis step, by heat treatment or the like, if the endoglucanses have substantial activity at the pH employed in the protein hydrolysis. It is also within the scope of the invention to isolate the hydolysate from the first hydrolysis before introducing it into the second hydrolysis. It is further contemplated that the protein hydrolysis and fiber hydrolysis may be carried out concurrently under some condition, such as where the endopeptidase and endoglucanase both have substantial activity at the same pH.

The okara hydrolysates may optionally be dried by any method known in the art. Preferably, the hydolystates are dried by spray drying. The hydolysates are typically dried to a water content of less than about 10% by weight, preferably less than about 8% by weight, and more preferably less than about 6% by weight.

In various other embodiments, the okara hydrolysate will comprise hydrolyzed fiber, hydrolyzed protein, or combinations thereof, and the water holding capacity of the okara may be reduced by at least about 10%, 15%, 20%, 25%, 30%, 35%, 40%, 45%, and even 50% as compared to the water holding capacity of the unhydrolyzed okara. Usually, but not necessarily, the water holding capacity of the okara will be reduced by less than about 95%, 90%, 85%, or 80% as compared to the water holding capacity of the unhydrolyzed okara.

The enzymatic hydrolysates of okara according to one embodiment the invention are substantially free of free amino acids. It is generally known in the art that free amino acids in food additives can impart flavors which are normally not associated with, or detract from, the flavors traditionally associated with foods. However, with due regard to the fact that some insubstantial amount of free amino acids may be formed upon hydrolysis with an endopeptidase or even present in the okara starting material, the okara hydolysates of the invention will comprise a free amino acid content of less than about 5%, and preferably, less than about 3%, and more preferably less than about 1% on a weight basis. Similarly, the enzymatic hydrolysates of okara according to one embodiment of the invention are preferably substantially free of simple sugars (i.e., mono-, di-, and tri-saccharides), such as for example, glucose, or are substantially free of simple sugars formed during hydrolysis. However, with due regard to the fact that some minor amount of free sugars may be formed upon hydrolysis with an endoglucanase, the fiber hydolysates of the invention will, according to one embodiment, comprise a content of free simple sugars formed during the glucanase hydrolysis of less than about 5%, preferably, less than about 3%, and more preferably, less than about 1% on a weight basis. Further, while the starting okara material may contain some amount of free simple sugars, the final okara hydolysate preferably contains less than about 15%, less than about 10%, or less than about 5% by weight simple sugars. As used herein, the term "simple sugar" refers to mono-, di-, and tri-saccharides.

The range of applications for the okara hydrolysate ingredients is substantially broader than unhydrolyzed okara due to the decreased functionality, in particular, decreased WHC. Nonetheless, the hydrolyzed okara ingredients largely preserve many of the advantageous characteristics of the fiber and protein components of okara but do not adversely impact the taste of products to which they are added. The hydrolysates of the invention may be used to supplement the protein and/or fiber content of food products or may be used to replace any amount of protein and/or fiber in conventional food products.

The present invention also provides food products comprising the okara hydrolysates described herein. The okara hydrolysates are suitable for addition to any food product. In one embodiment, the food product is a bread product, such as a yeast leavened bread product, comprising the okara hydrolysates of the invention. Preferred bread products according to this embodiment of the invention include, but are not limited to, white bread, hamburger buns, rolls, wheat bread, tortillas, bagels, pasta, snack foods, and muffins. The hydrolysates of the invention are contemplated to be useful in nutritional supplements such as, for example, energy bars, protein bars, and the like. In addition to the foregoing, the hydrolysates of the invention are contemplated to be particularly suited for incorporation in cheese products, including low-fat cheeses, yogurt, sauces, beverages and the like.

The hydrolysates may be added to foods in any essentially amount. In the case of a bread product, particularly a yeast leavened bread, the okara hydrolysates are suitably added to flour, such as wheat flour, at a level of at least about 5%, at least about 10%, at least about 20%, at least about 30%, at least about 40%, at least about 50%, at least about 60%, at least about 70%, at least about 80%, at least about 90%, at least about 100%, or at least about 120%, on a flour weight basis. In one embodiment, the okara hydrolysate is added to wheat flour from about 5% to about 200% by flour weight, preferably from about 10 or about 15% to about 100% by flour weight.

In one embodiment, the hydrolysates of the invention are used to supplement the protein and/or fiber content of foods by adding the hydrolysates to foods already comprising conventional amounts of protein and/or fiber. In another embodiment, the hydrolysates are employed as a partial or complete replacement for protein and/or fiber conventionally found in food products. Accordingly, the invention provides a method of increasing the protein and/or fiber content of a food product comprising replacing an amount of food protein and/or fiber characteristic of the food product with an amount equal to or greater on a weight basis of the okara hydrolysates of the invention. Due to the reduced WHC of the okara hydrolysates, they are preferably added to food products in an amount greater on a weight basis than the protein or fiber which they replace.

EXAMPLES

Examples 1-3 provide hydrolyzed okara compositions according to the invention. In each case the okara (before hydrolysis) had a moisture content of about 80% (±2%) by weight, total fat content of about 1.8% by weight, total dietary fiber content of 11.3% by weight, total protein content of 5.7% by weight, sugar content of 0.3% by weight, and ash content of 0.8% by weight.

Example 1

Enzymatic Fiber Hydrolysis of Okara

This example provides an hydrolysate of okara according to the invention in which only the fiber portion of okara is enzymatically hydrolyzed. The mixing bowl of a high speed mixer was charged with 7.5 kg of purified water and 6.0 kg of okara. The mixture was stirred at 160° F. for about 15 minutes followed by addition of 23.4 g of 85% phosphoric acid to bring the pH of the mixture to 5.12. The mixture was cooled to about 125° F. using a heat exchanger. To this mixture, 2.43 g of Celluclast™ BG (Novo Nordisk) and 2.43 g of Viscozyme L (Novo Nordisk) were added and mixing was continued for 60 to 120 minutes. The temperature was then raised to 195° F. for 30 seconds or more to inactivate the enzymes. The resulting hydrolysate of okara was air dried to a moisture content of less than about 6%.

Example 2

Enzymatic Protein Hydrolysis of Okara

This example provides an hydrolysate of okara according to the invention in which only the protein portion of okara is enzymatically hydrolyzed. The mixing bowl of a high speed mixer was charged with 7.5 kg of purified water and 6.0 kg of okara. The mixture was stirred at 160° F. for about 15 minutes at which point the pH was measured to be 6.65. The mixture was then cooled to about 125° F. using a heat exchanger. To this mixture, 3.67 g of the endopetidase Neutrase™ 1.5 (Novozyme) was added and mixing continued at high speed for between 30 and 60 minutes. The temperature was then raised to 195° F. for 30 seconds or more to inactivate the enzymes. The resulting hydrolysate of okara was air dried to a moisture content of less than about 6%.

Example 3

Enzymatic Fiber and Protein Hydrolysis of Okara

This example provides an hydrolysate of okara according to the invention in which both the fiber and protein portions of okara are enzymatically hydrolyzed. The mixing bowl of a high speed mixer was charged with 7.5 kg of purified water and 6.0 kg of okara. The mixture was stirred at 160° F. for about 15 minutes at which point the pH was measured to be 6.6. The mixture was then cooled to about 125° F. using a heat exchanger. To this mixture, 3.50 g of the endopetidase Neutrase™ 1.5 (Novozyme) was added and the material was blended for 60 minutes. The pH of the aqueous dispersion was then brought to about 5.0 by the addition of 23.4 g of 85% phosphoric acid. 2.84 g of Celluclast™ BG (Novo Nordisk) and 2.84 g of Viscozyme L (Novo Nordisk) were then added and mixing was continued for 60 to 105 minutes. The temperature was then raised to 195° F. for 30 seconds or more to inactivate the enzymes. The resulting hydrolysate of okara was air dried to a moisture content of less than about 6%.

Example 4

The following method was devised to estimate the relative reduction in water-holding capacity (WHC) of the hydrolyzed okara samples of the preceding Examples 1-3 as compared to untreated okara. This method does not measure the absolute WHC of the sample but provides as useful basis for comparing the relative WHC between samples. For each of the samples prepared according to Examples 1-3 and for unhydrolyzed okara the following procedure was used.

85 g (85 ml) of distilled water and 10 g of dry okara sample were mixed in a graduated cylinder as follows. A 100 ml graduated cylinder (24 cm tall, 3 cm diameter) was placed on a scale and tared. The graduated cylinder was charged with 40 g (40 ml) of distilled water then 5 g of the okara sample was weighed onto the top of the water. An additional 45 g (45 ml) of distilled water was weighed onto the top of the added okara and another 5 g of okara sample was then weighed onto the water. The contents were mixed with a spatula for about one minute until homogenous. While the foregoing series of weighing steps and additions are not strictly necessary, it has been found that the homogeneity of the mixture is greatly improved by adhering to these steps and thus the accuracy and reproducibility of the results is markedly improved.

The graduated cylinder is covered with aluminum foil or the like to prevent evaporation and the contents are left in the graduated cylinder undisturbed for one hour. After one hour, the okara sample and the water will separate into a sludge phase and a fluid phase with a clear demarcation between the two phases. The volume of the fluid phase (top phase) is measured using the graduations on the cylinder. The WHC is estimated as follows:

$$\frac{V_i - V_f}{W_s} \times 100$$

where $V_i$ is the initial volume of water of water in milliliters added to the graduated cylinder (i.e., 85 ml in the above protocol), $V_f$ is the volume of the fluid (top) phase in milliliters measured after the sludge has separated out, and $W_s$ is the total weight in grams of dry okara sample utilized (i.e., 10 g in the above protocol). The results of the study are shown below in Table 1.

TABLE 1

| Sample | Estimated WHC (%) | % Reduction in WHC |
| --- | --- | --- |
| Untreated Okara | 830 | — |
| Example 1 | 640 | 23 |
| Example 2 | 780 | 6 |
| Example 3 | 470 | 43 |

It is evident from the data in Table 1 that the fiber hydrolysis of Example 1 has a more pronounced impact on WHC of the okara than does the protein hydrolysis of Example 2. This could result from occlusion of the protein and its interior domains within the fibrous structure of okara which renders these domains inaccessible to the endopeptidase. However, when both protein and fiber hydrolysis are preformed, there is observed a synergistic reduction in WHC, likely due to the fact that the hydrolysis of fiber and protein act cooperatively to modify the structure of okara and thereby facilitate interaction of the enzymes with the protein and fiber.

It will be understood that the recitation of ranges contained herein are as a matter of convenience only and the inventors are in possession of every value intermediate within the ranges. That is, every intermediate value or sub-range within a disclosed range should be understood to be inherently disclosed.

The invention having been described by the foregoing description of the preferred embodiment, it will be understood that the skilled artisan may make modifications and variations of these embodiments without departing from the spirit or scope of the invention as set forth in the following claims.

The invention claimed is:

1. A method for making an enzymatic hydrolysate of okara comprising contacting an aqueous dispersion of okara with one or more endopeptidase enzymes and one or more endoglucanase enzymes in the substantial absence of exopeptidase and exoglucanase enzymes, and drying said aqueous dispersion to a moisture content of less than about 10% by weight to provide an enzymatic hydrolysate of okara having a reduction in water-holding capacity (WHC) of about 5% to about 75% as compared to the WHC of said okara prior to enzymatic hydrolysis, said enzymatic hydrolysate characterized in that a homogenous dispersion of 10 g of said hydrolysate in 85 g of distilled water will separate into distinct phases on standing undisturbed for 1 hour.

2. The method of claim 1 wherein said aqueous dispersion of okara is contacted with said one or more endopeptidase enzymes before said one or more endoglucanase enzymes.

3. The method of claim 2 wherein said water-holding capacity (WHC) is reduced by about 20% to about 60% as compared to the WHC of said okara prior to enzymatic hydrolysis.

4. The method of claim 3 wherein said water-holding capacity (WHC) is reduced by about 35% to about 50% as compared to the WHC of said okara prior to enzymatic hydrolysis.

5. A method for making an enzymatic hydrolysate of okara comprising contacting an aqueous dispersion of hydrated okara with, in order, one or more endopeptidase enzymes and one or more endoglucanase enzymes, in the substantial absence of exopeptidase and exoglucanase enzymes, and drying said aqueous dispersion to a moisture content of less than about 10% by weight to thereby provide an hydrolysate of okara having a synergistic reduction in water-holding capacity (WHC) as compared to the reduction in WHC obtainable with either said one or more endopeptidase enzymes or said one or more endoglucanase enzymes, alone, under identical conditions, said enzymatic hydrolysate characterized in that a homogenous dispersion of 10 g of said hydrolysate in 85 g of distilled water will separate into distinct phases on standing undisturbed for 1 hour.

6. A method for making an enzymatic hydrolysate of okara comprising:
(a) contacting an aqueous dispersion of hydrated okara with one or more endopeptidase enzymes and mixing therewith for about 30 to about 180 minutes at a temperature of about 100° F. to about 145° F. and a pH between about 5.5 to about 7; said aqueous dispersion comprising a weight ratio of hydrated okara to water of about 3:1 to about 1:3, and said one or more endopeptidase enzymes being present, collectively, in an amount from about 0.1% to about 10% by weight based on the weight of protein in said hydrated okara;
(b) contacting said aqueous dispersion with one or more endoglucanase enzymes at a pH between about 4 and about 6 and mixing therewith for about 45 to about 240 minutes at a temperature of about 100° F. to about 145° F.; said one or more endoglucanase enzymes being present, collectively, in an amount from about 0.1% to about 10% by weight based on the weight of dietary fiber in said hydrated okara;
(c) inactivating said enzymes; and
(d) drying said aqueous dispersion to a moisture content of less than about 10% by weight to provide an hydrolysate of okara comprising hydrolyzed protein and hydrolyzed fiber and having a water-holding capacity (WHC) which is reduced by about 5% to about 75% as compared to the WHC of said okara before enzymatic hydrolysis;
wherein steps (a) and (b) are performed in the substantial absence of exopeptidase and exoglucanase enzymes; and
wherein said hydrolysate of okara is characterized in that a homogenous dispersion of 10 g of said hydrolysate in 85 g of distilled water will separate into distinct phases on standing undisturbed for 1 hour.

7. The method of claim 6 wherein said aqueous dispersion of okara comprises a weight ratio of hydrated okara to water of about 2:1 to about 1:2.

8. The method of claim 6 wherein said aqueous dispersion of okara comprises a weight ratio of hydrated okara to water of about 1:1 to about 1:1.5.

9. The method of claim 6 wherein said aqueous dispersion of okara comprises a weight ratio of hydrated okara to water of about 1:1.25.

10. The method of claim 6 wherein the temperature in steps (a) and (b) is between about 115° F. to about 135° F.

11. The method of claim 6 wherein the temperature in steps (a) and (b) is about 125° F.

12. The method of claim 6 wherein the pH in step (a) is between about 6 to about 6.9.

13. The method of claim 6 wherein the pH in step (b) is about 5.

14. The method of claim 6 wherein said one or more endopeptidase enzymes are present, collectively, in an amount from about 0.1% to about 2% by weight based on the weight of protein in said hydrated okara.

15. The method of claim 6 wherein said one or more endoglucanase enzymes are present, collectively, in an amount from about 0.1% to about 2% by weight based on the weight of dietary fiber in said hydrated okara.

16. The method of claim 6 wherein said water-holding capacity (WHC) is reduced by about 20% to about 60% as compared to the WHC of said okara prior to enzymatic hydrolysis.

17. The method of claim 6 wherein said water-holding capacity (WHC) is reduced by about 35% to about 50% as compared to the WHC of said okara prior to enzymatic hydrolysis.

18. The method of claim 6 wherein step (c) comprises heating the aqueous dispersion to at least about 160° F. for about 60 seconds or more.

19. The method of claim 6 wherein step (c) comprises heating the aqueous dispersion to about 195° F. for about 30 seconds or more.

20. The method according to claim 1, wherein the one or more endoglucanase enzymes comprise an endo-1,3(4) beta-glucanase with xylanase, hemicellulase, and cellulase side activities produced by submerged fermentation of *Aspergillus aculeatus*.

21. The method according to claim 1, wherein the one or more endoglucanase enzymes comprise a cellulase produced by submerged fermentation of the fungus, *Trichoderma reesei*.

22. The method according to claim 1, wherein the one or more endoglucanase enzymes comprise an endo-1,3(4) beta-glucanase with xylanase, hemicellulase, and cellulase side activities produced by submerged fermentation of *Aspergillus aculeatus* and a cellulase produced by submerged fermentation of the fungus, *Trichoderma reesei*.

* * * * *